(12) United States Patent
Taniguchi et al.

(10) Patent No.: US 11,691,519 B2
(45) Date of Patent: Jul. 4, 2023

(54) ELECTRICALLY DRIVEN VEHICLE

(71) Applicant: DENSO CORPORATION, Kariya (JP)

(72) Inventors: Kazuya Taniguchi, Aichi-ken (JP); Taro Shimosaka, Aichi-ken (JP); Kunihiro Suzuki, Aichi-ken (JP); Ken Toshiyuki, Aichi-ken (JP); Koichi Sakata, Aichi-ken (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/707,695

(22) Filed: Dec. 9, 2019

(65) Prior Publication Data
US 2020/0231046 A1    Jul. 23, 2020

(30) Foreign Application Priority Data

Jan. 23, 2019   (JP) .................. 2019-009687

(51) Int. Cl.
*B60L 15/20*     (2006.01)
*B60K 7/00*      (2006.01)
(Continued)

(52) U.S. Cl.
CPC ............ *B60L 15/20* (2013.01); *B60K 7/0007* (2013.01); *H02P 5/74* (2013.01); *H02P 21/10* (2013.01); *H02P 21/22* (2016.02); *B60L 2240/12* (2013.01); *B60L 2240/423* (2013.01); *B60L 2250/28* (2013.01)

(58) Field of Classification Search
CPC .. B60L 15/20; B60L 2240/12; B60L 2250/28; B60L 2240/423; B60K 7/0007; H02P 5/74; H02P 21/22; H02P 21/10
See application file for complete search history.

(56) References Cited

U.S. PATENT DOCUMENTS

| | | | | |
|---|---|---|---|---|
| 5,446,351 A | * | 8/1995 | Kusano | B60L 15/2063 180/170 |
| 2003/0137270 A1 | * | 7/2003 | Sano | H02P 5/00 318/625 |

(Continued)

FOREIGN PATENT DOCUMENTS

| | | |
|---|---|---|
| JP | 6-78416 | 3/1994 |
| JP | 2014-155402 A | 8/2014 |

(Continued)

*Primary Examiner* — Kawing Chan
*Assistant Examiner* — Bradley R Brown
(74) *Attorney, Agent, or Firm* — Sughrue Mion, PLLC

(57) ABSTRACT

There is provided an electrically driven vehicle that well balances calculation volumes and communication volumes of two control devices configured to drive and control motors for driving. The electrically driven vehicle comprises at least one motor for driving and a first control device and a second control device configured to control the motor. The first control device is configured to calculate a target torque that is to be output from the motor, based on information including an accelerator position, to calculate a current command based on the calculated target torque, and to send the calculated current command to the second control device. The second control device is configured to use the current command, a phase current of the motor and a rotational angle of the motor such as to drive the motor by feedback control.

7 Claims, 2 Drawing Sheets

(51) Int. Cl.
*H02P 5/74* (2006.01)
*H02P 21/10* (2016.01)
*H02P 21/22* (2016.01)

(56) References Cited

U.S. PATENT DOCUMENTS

2007/0241715 A1* 10/2007 Fujiwara ................ H02P 21/14
 318/609
2016/0068079 A1* 3/2016 Li ....................... B60L 15/2009
 701/22
2020/0140005 A1* 5/2020 Fuji .................... G05B 19/0421

FOREIGN PATENT DOCUMENTS

| JP | 2014-230351 | | 12/2014 |
| JP | 2015-156763 | A | 8/2015 |
| JP | 2016-092995 | A | 5/2016 |
| JP | 2019037066 | A | 3/2019 |

* cited by examiner

ELECTRICALLY DRIVEN VEHICLE

CROSS-REFERENCE TO RELATED APPLICATIONS

The present disclosure claims priority to Japanese Patent Application No. 2019-009687 filed Jan. 23, 2019, which is incorporated herein by reference in its entirety including specification, drawings and claims.

TECHNICAL FIELD

The present disclosure relates to an electrically driven vehicle or more specifically to an electrically driven vehicle provided with two control devices that are configured to control motors for driving.

BACKGROUND

A proposed electrically driven vehicle includes a vehicle integration control unit configured to calculate a torque command (target torque) of a motor based on drive information of the motor and an accelerator information, and a motor control device configured to send the drive information of the motor to the vehicle integration control unit and to drive and control the motor based on the torque command sent from the vehicle integration control unit (as described in, for example, JP 2014-155402A). The electrically driven vehicle of this configuration is further provided with input units configured to give operation commands to the motor control device separately from the vehicle integration control unit or more specifically an operation command input unit configured to give an operation command from a drive operation panel using a terminal signal and another operation command input unit configured to give an operation command from an operation substitution device. The operation commands are given to the motor control device in a priority order that is determined in advance for the respective input units, so as to drive and control the motor.

SUMMARY

In general, a motor for driving is driven and controlled by feedback control based on a torque command and a rotational angle of the motor. A general procedure of this drive control calculates a current command from the torque command, uses a feedback value based on the rotational angle of the motor and a phase current to be applied to the motor, for the current command such as to generate a pulse, and performs switching control of switching elements included in an inverter based on the pulse generation to apply the phase current to the motor. In a configuration that divides such motor control into two control devices, various strategies are employable for the division of motor control. In a configuration that assigns a series of processing to calculation of the torque command to a first control device and assigns a series of processing after the calculation of the torque command to a second control device, the second control device needs to calculate the current command and perform feedback control. This configuration increases the calculation volume of the second control device. In a configuration that assigns a series of processing after pulse generation to the second control device with a view to reducing the calculation volume of the second control device, on the other hand, there is a need to provide three signal lines for outputting a sine signal, a cosine signal and an excitation signal in a general resolver that is used for detection of the rotational angle of the motor. This configuration increases the communication volume between the first control device and the second control device. This causes a significant increase of communication volume in an electrically vehicle equipped with in-wheel motors that are built in respective drive wheels.

A main object of an electrically driven vehicle of the present disclosure is to well balance calculation volumes and communication volumes of two control devices that are configured to drive and control a motor for driving.

In order to achieve the above primary object, the electrically driven vehicle of the present disclosure employs the following configuration.

The present disclosure is directed to an electrically driven vehicle. An electrically driven vehicle includes at least one motor for driving and a first control device and a second control device configured to control the motor. The first control device and the second control device are connected with each other to make communication. The first control device is configured to calculate a target torque that is to be output from the motor, based on information including an accelerator position, to calculate a current command based on the target torque, and to send the current command to the second control device. The second control device is configured to use the current command, a phase current of the motor and a rotational angle of the motor such as to drive the motor by feedback control.

In the electrically driven vehicle of this aspect, the first control device and the second control device configured to control the motor for driving are connected with each other to make communication. The first control device calculates the target torque that is to be output from the motor based on the information including the accelerator position, calculates the current command based on the calculated target torque, and sends the calculated current command to the second control device. The second control device drives the motor by feedback control by using the current command, the phase current of the motor and the rotational angle of the motor. The first control device performs a series of processing to calculation of the current command, so that the second control device does not need to calculate the current command. This configuration accordingly reduces the calculation volume of the second control device. Feedback values are, on the other hand, used in the second control device, so that there is no need to send the feedback values by communication. This configuration accordingly suppresses a significant increase in communication volume. As a result, the configuration of this aspect well balances the calculation volumes and the communication volumes of the two control devices that are configured to drive and control the motor for driving.

DESCRIPTION OF EMBODIMENTS

Figure 1:
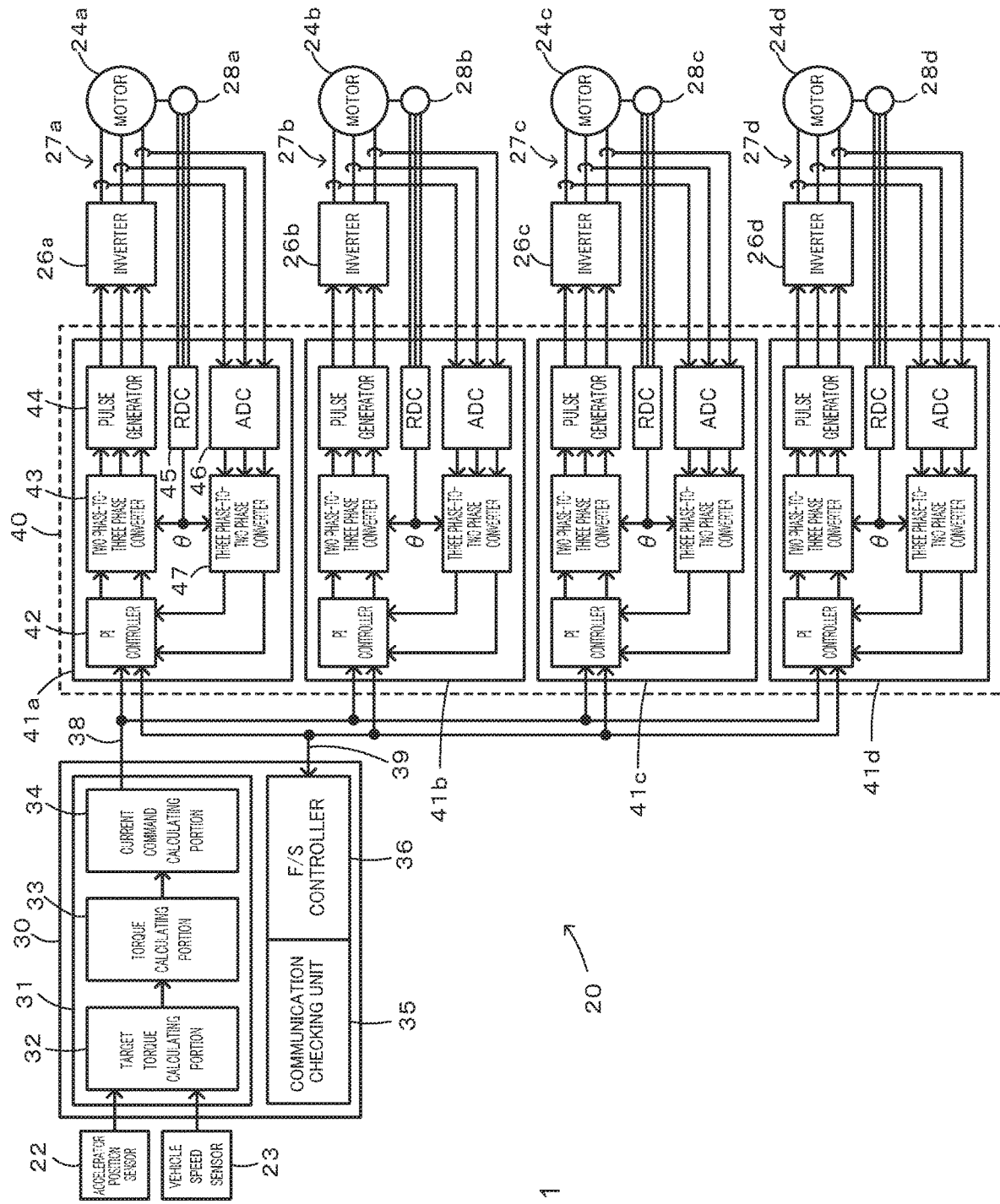
FIG. 1 is a configuration diagram illustrating the schematic configuration of an electrically driven vehicle 20 according to one embodiment of the present disclosure.
Figure 2:
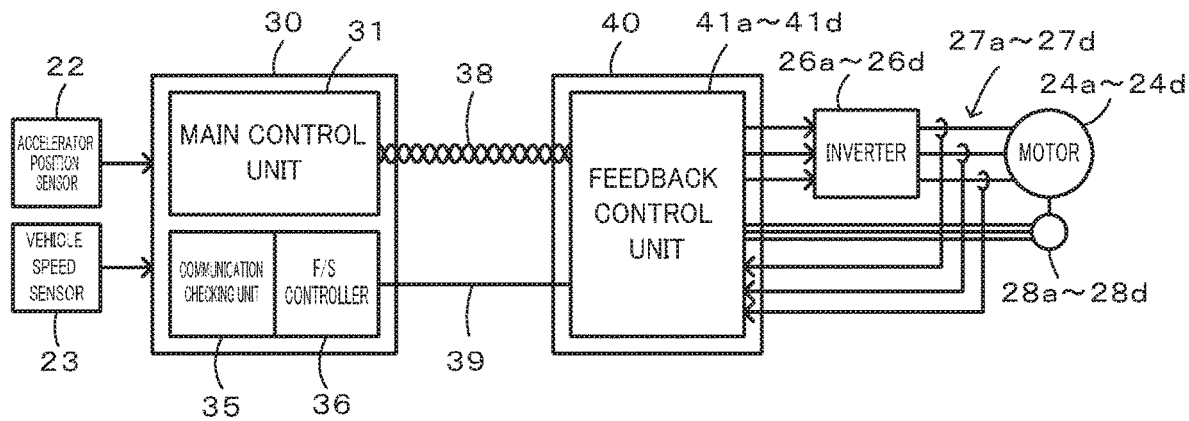
FIG. 2 is a simplified configuration diagram illustrating the simplified configuration of the electrically driven vehicle 20 according to the embodiment.

The following describes some aspects of the disclosure with reference to embodiments. FIG. 1 is a configuration diagram illustrating the schematic configuration of an electrically driven vehicle 20 according to one embodiment of the present disclosure. FIG. 2 is a simplified configuration diagram illustrating the simplified configuration of the electrically driven vehicle 20 according to the embodiment. The electrically driven vehicle 20 of the embodiment is configured as a four-wheel drive electric vehicle driven with driving force output from four in-wheel motors 24a to 24d that are respectively built in four drive wheels on the left side and on the right side. The electrically driven vehicle 20 includes four inverters 26a to 26d, four sets of phase current sensors 27a to 27d, four angle sensors 28a to 28d, an accelerator position sensor 22, a vehicle speed sensor 23, a first control device 30 and a second control drive 40, in addition to the four in-wheel motors 24a to 24d.

The four inverters 26a to 26d are configured as known inverter circuits to drive the four in-wheel motors 24a to 24d. The four sets of phase current sensors 27a to 27d are sensors provided to detect electric currents (phase currents) Iu, Iv and Iw of three phases, i.e., u phase, v phase and w phase, that are applied from the respective four inverters 26a to 26d to the corresponding four in-wheel motors 24a to 24d. These electric currents are three phase AC currents. Accordingly, the electric currents of only two phases out of the three phases may be detected by current sensors, and the electric current of remaining one phase may be obtained by calculation. The four angle sensors 28a to 28d are sensors provided to detect rotational angles θ of the four in-wheel motors 24a to 24d and are configured by resolvers according to the embodiment. Accordingly, three signal lines, i.e., a sine signal line, a cosine signal line and an excitation signal line are output from the four angle sensors 28a to 28d.

The first control device 30 is configured to include a main control unit 31, a communication checking unit 35 and a failsafe controller (F/S controller) 36. The first control device 30 is arranged to make communication with the second control device 40 by using a high-speed communication line 38 and a low-speed communication line 39.

The main control unit 31 includes a target torque calculating portion 32, a torque calculating portion 33 and a current command calculating portion 34. The target torque calculating portion 32 is configured to calculate a target torque that is to be output to the vehicle, based on the accelerator position Acc input from the accelerator position sensor 22 and the vehicle speed V input from the vehicle speed sensor 23. The torque calculating portion 33 is configured to calculate torques Ta to Td that are to be output from the respective in-wheel motors 24a to 24d, based on the target torque calculated by the target torque calculating portion 32 and to cause these calculated torques Ta to Td to be processed by, for example, upper limit and lower limit restriction or a smoothing process, so as to calculate torque commands Ta* to Td*. The current command calculating portion 34 is configured to calculate current commands Ia* to Id* that are to be applied to the respective in-wheel motors 24a to 24d, based on the torque commands Ta* to Td* calculated by the torque calculating portion 33. The calculated current commands Ia* to Id* are sent to respective feedback control units 41a to 41d included in the second control device 40 via the high-speed communication line 38.

With a view to checking whether the current commands Ia* to Id* calculated by the current command calculating portion 34 are normally sent via the high-speed communication line 38, the communication checking unit 35 is configured to obtain the current commands Ia* to Id*, which are calculated and sent by the current command calculating portion 34, at a predetermined frequency (for example, at intervals of ten times of an ordinary communication interval) from the second control device 40 by using the low-speed communication line 39 and to confirm that the obtained current commands Ia* to Id* are identical with the sent current commands Ia* to Id*.

The failsafe controller 36 is configured to adjust current commands Ia* to Id* for failsafe, based on the current commands Ia* to Id* calculated by the current command calculating portion 34, with a view to allowing for an evacuation drive on the occurrence of an abnormality in communication by the high-speed communication line 38. The adjusted current commands Ia* to Id* are sent to the second control device 40 by using the low-speed communication line 39.

The second control device 40 includes four feedback control units 41a to 41d provided corresponding to the respective in-wheel motors 24a to 24d. Each of the feedback control units 41a to 41d is configured by functional blocks that are used for general motor feedback control and that include a PI controller 42, a two phase-to-three phase converter 43, a pulse generator 44, a resolver digital converter (RDC) 45, an analog digital converter (ADC) 46, and a three phase-to-two phase converter 47. The respective feedback control units 41a to 41d are configured as identical units. Accordingly, suffix alphabets "a" to "d" are omitted with regard to the functional blocks of the feedback control units 41a to 41d shown in FIG. 1.

In the electrically driven vehicle 20 having the configuration described above, the main control unit 31 of the first control device 30 calculates the current commands Ia* to Id* of the four in-wheel motors 24a to 24d, based on the accelerator position Acc input from the accelerator position sensor 22 and the vehicle speed V input from the vehicle speed sensor 23, and sends the calculated current commands Ia* to Id* to the respective feedback control units 41a to 41d of the second control device 40 by using the high-speed communication line 38. The respective feedback control units 41a to 41d of the second control device 40 respectively use the received current commands Ia* to Id*, the phase currents Iu, Iv and Iw and the motor rotational angles θ to generate pulses by feedback control and then perform switching control of switching elements (not shown) included in the respective inverters 26a to 26d such as to drive the respective in-wheel motors 24a to 24d. As clearly understood from the foregoing, only the current commands Ia* to Id* are the subject of communication between the first control device 30 and the second control device 40. This configuration accordingly reduces the load of the high-speed communication line 38. Furthermore, the second control device 40 does not need to calculate the current commands Ia* to Id*. This configuration reduces the loads of the respective feedback control units 41a to 41d. As a result, this configuration well balances the calculation volumes and the communication volumes of the two control devices to drive and control the four in-wheel motors 24a to 24d.

Figure 3:
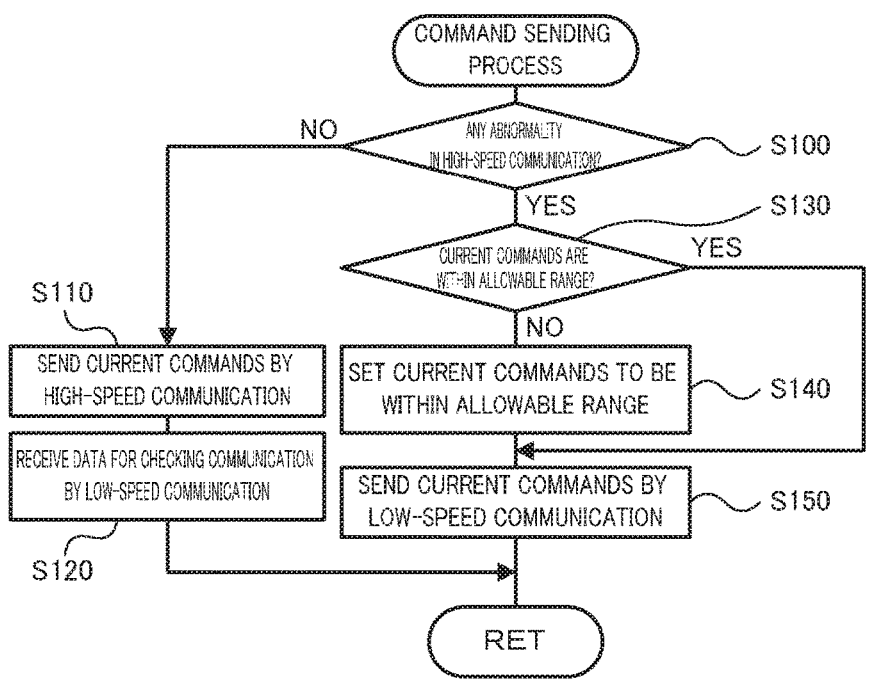
FIG. 3 is a flowchart showing one example of a command sending process.

The electrically driven vehicle 20 of the embodiment performs a command sending process illustrated in FIG. 3 to send the current commands Ia* to Id*. The command sending process first determines whether any abnormality occurs in communication by the high-speed communication line 38 (step S100). More specifically, this determination may determine whether the communication checking unit 35 provides a successful confirmation result. The abnormality in communication is, for example, disconnection of the high-speed communication line 38. When it is determined that no abnormality occurs in communication by the high-speed communication line 38, the command sending process performs ordinary transmission to send the current commands Ia* to Id* by using the high-speed communication line 38 (step S110), obtains data for checking communication (current commands Ia* to Id*) by using the low-speed communication line 39 and checks the communication (step S120), and is then terminated.

When it is determined at step S100 that an abnormality occurs in communication by the high-speed communication line 38, on the other hand, the command sending process subsequently determines whether the current commands Ia* to Id* are within an allowable range as failsafe (step S130). The failsafe herein is, for example, an evacuation drive. Accordingly, this determination may determine whether differences of present values of the current commands Ia* to Id* from previous values are within an allowable range in order to avoid sudden acceleration or may determine whether the current commands Ia* to Id* are equal to or lower than upper limit values. When it is determined that the current commands Ia* to Id* are within the allowable range as failsafe, the command sending process sends the current commands Ia* to Id* by using the low-speed communication line 39 (step S150) and is then terminated. When it is determined that the current commands Ia* to Id* are not within the allowable range as failsafe, on the other hand, the command sending process sets the current commands Ia* to Id* to be within the allowable range (step S140), sends the set current commands Ia* to Id* by using the low-speed communication line 39 (step S150), and is then terminated. A concrete procedure of setting the current commands Ia* to Id* at step S140 may set the current commands Ia* to Id* such that the differences from the previous values are within the allowable range or may set the current commands Ia* to Id* such as to be equal to or lower than the upper limit values.

Even in the event of an abnormality occurring in communication by the high-speed communication line 38, the electrically driven vehicle 20 of the embodiment sends the current commands Ia* to Id* to the second control device 40 by using the low-speed communication line 39 and accordingly allows for an evacuation drive as failsafe. Furthermore, the electrically driven vehicle 20 of the embodiment sends the current commands Ia* to Id* within the allowable range as failsafe and accordingly ensures an evacuation drive as more appropriate failsafe.

In the electrically driven vehicle 20 of the embodiment, the first control device 30 is configured to include the communication checking unit 35 and the failsafe controller 36. According to a modification, however, the first control device 30 may be configured without the communication checking unit 35 and the failsafe controller 36.

In the electrically driven vehicle 20 of the embodiment, the first control device 30 and the second control device 40 are connected with each other by the high-speed communication line 38 and the low-speed communication line 39 and establish communication by the high-speed communication line 38 and communication by the low-speed communication line 39. According to a modification, however, the electrically driven vehicle 20 may be configured without the low-speed communication line 39.

The embodiment describes the present disclosure applied to the electrically driven vehicle provided with the four in-wheel motors 24a to 24d. The present disclosure may also be applied to an electrically driven vehicle provided with a single motor for driving, to an electrically driven vehicle provided with two or three motors for driving, or to an electrically driven vehicle provided with five or more motors for driving.

The following describes the correspondence relationship between the primary components of the embodiment and the primary components of the disclosure described in Summary. Four in-wheel motors 24a to 24d of the embodiment corresponds to the "motor", the first control device 30 corresponds to the "first control device" and the second control device 40 corresponds to the "second control device".

In the electrically driven vehicle of this aspect, the electrically driven vehicle may include a plurality of motors as the at least one motor. The first control device may be configured as a single main control unit to calculate the target torque and the current command of each of the plurality of motors. The second control unit may be configured as a plurality of feedback control units to perform feedback control with regard to each of the plurality of motors. The electrically driven vehicle of this aspect enables the respective motors to be controlled by simply using the plurality of feedback control units corresponding to the number of the motors.

In the electrically driven vehicle of another aspect, at least one motor may comprise a plurality of in-wheel motors built in a plurality of drive wheels. The electrically driven vehicle provided with the plurality of in-wheel motors require multiple individual controls corresponding to the number of the motors. This is likely to cause a significant increase of the communication volume. The electrically driven vehicle of this aspect, however, does not need communication of feedback values. This configuration accordingly suppresses a significant increase in communication volume.

In the electrically driven vehicle of this aspect, the first control device and the second control device may be connected with each other by a high-speed communication line and by a low-speed communication line that has a lower communication speed than the high-speed communication line. In an event of an abnormality occurring in communication by the high-speed communication line, the first control device may be configured to calculate a current command that is to be used to control the at least one motor, within a range of failsafe and to send the calculated current command by using the low-speed communication line. The electrically driven vehicle of this aspect allows for an evacuation drive even in the event of an abnormality occurring in the high-speed communication line.

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the electrically driven vehicle and so on.

What is claimed is:

1. An electrically driven vehicle comprising at least one motor for driving and a first control device and a second control device configured to control the motor, wherein
the first control device and the second control device are connected by a high speed communication line and a low speed communication line that has a lower communication speed than the high-speed communication line,
the first control device is configured to:
calculate a target torque that is to be output from the motor; based on information including an accelerator position;
calculate a current command based on the target torque; and
send the current command to the second control device over the high speed communication line, and
the second control device is configured to:
use the current command calculated by the first control device, a phase current of the motor and a rotational angle of the motor such as to drive the motor by feedback control; and
send the current command to the first control device over the low speed communication line.

2. The electrically driven vehicle according to claim 1, comprising:
a plurality of motors as the at least one motor, wherein
the first control device is configured as a single main control unit to calculate the target torque and the current command of each of the plurality of motors, and
the second control unit is configured as a plurality of feedback control units to perform feedback control with regard to each of the plurality of motors.

3. The electrically driven vehicle according to claim 1, wherein the at least one motor comprises a plurality of in-wheel motors built in a plurality of drive wheels.

4. The electrically driven vehicle according to claim 2, wherein the plurality of motors are a plurality of in-wheel motors built in a plurality of drive wheels.

5. The electrically driven vehicle according to claim 1, in an event of an abnormality occurring in communication by the high-speed communication line, the first control device is configured to calculate a current command that is to be used to control the at least one motor, within a range of failsafe and to send the calculated current command by using the low-speed communication line.

6. The electrically driven vehicle according to claim 2, in an event of an abnormality occurring in communication by the high-speed communication line, the first control device is configured to calculate current commands that are to be used to control the plurality of motors, within a range of failsafe and to send the calculated current commands by using the low-speed communication line.

7. The electrically driven vehicle according to claim 3, in an event of an abnormality occurring in communication by the high-speed communication line, the first control device is configured to calculate current commands that are to be used to control the plurality of in-wheel motors, within a range of failsafe and to send the calculated current commands by using the low-speed communication line.

* * * * *